UNITED STATES PATENT OFFICE.

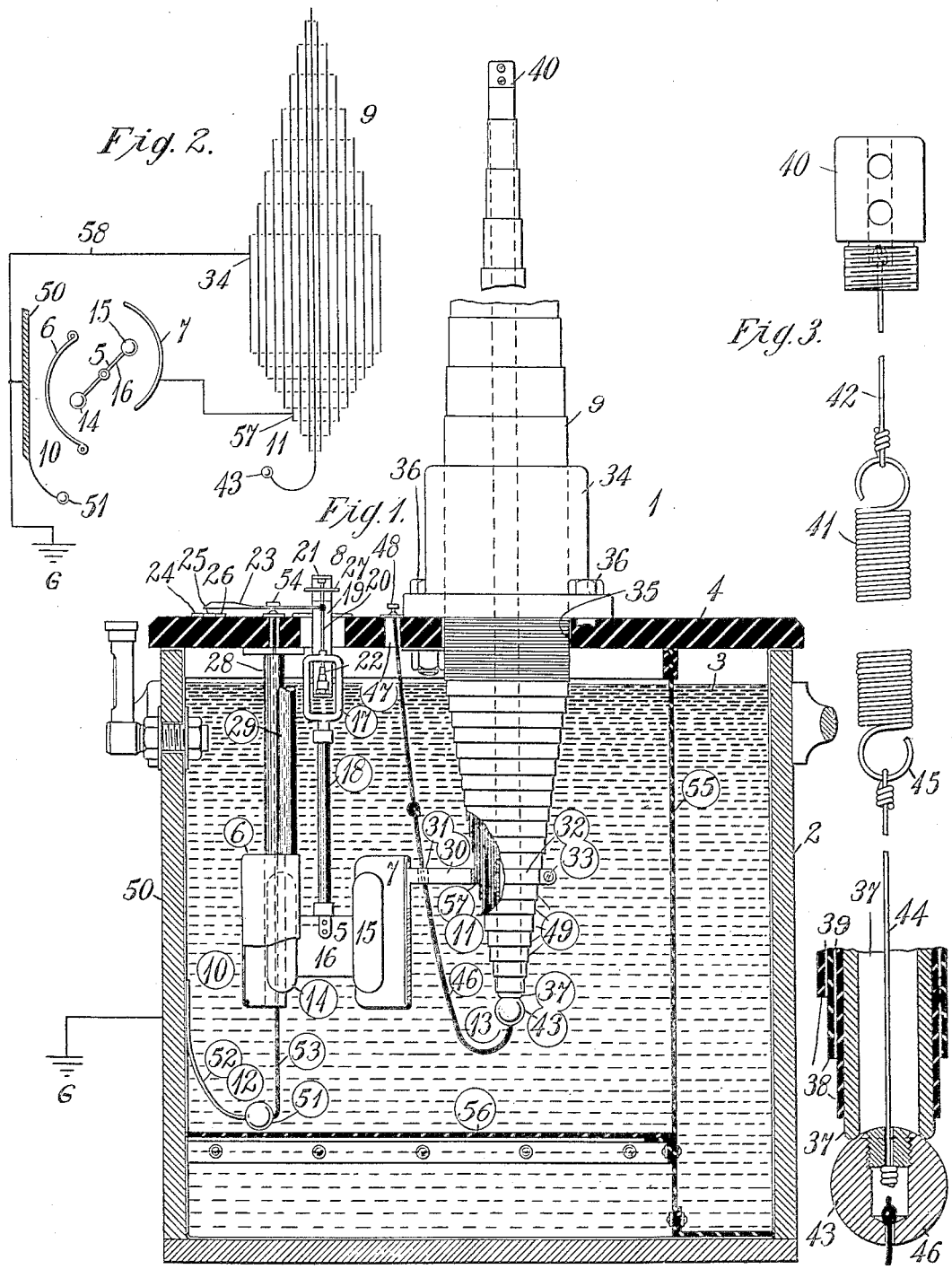

ARTHUR B. REYNDERS, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,120,850.

Specification of Letters Patent.

Patented Dec. 15, 1914.

Application filed September 6, 1910. Serial No. 580,764.

*To all whom it may concern:*

Be it known that I, ARTHUR B. REYNDERS, a citizen of the United States, and a resident of Wilkinsburg, in the county of Allegheny and State of Pennsylvania, have invented a new and useful Improvement in Electrical Measuring-Instruments, of which the following is a specification.

My invention relates to electrical measuring instruments of the electrostatic type, and it has particular reference to such instruments as are adapted for use in measuring very high potentials.

The object of my invention is to provide a device of the above-indicated class that shall be of particularly simple and durable construction and shall embody adequate means for adapting the instrument for accurate use over a wide range of voltages.

Heretofore, it has been common practice to employ auxiliary condensers in combination with oil-immersed electrostatic instruments, and to provide means whereby the capacity of such condensers could be varied, in order to effect a change in the range of operation of the instruments. However, in such devices, considerable difficulty has been experienced in suitably mounting and insulating said units from the metallic receptacles to which they were secured.

According to my invention, I employ a bushing of the so-called "condenser type" for insulating the high-voltage terminal from the inclosing casing, and I connect the instrument vanes in multiple with one or more layers of said condenser bushing and also make use of a plurality of said layers as an auxiliary condenser. Another simple condenser unit that is utilized comprises one of the stationary vanes and the adjacent casing. In order to adapt said instrument for different voltage ranges, suitable means are employed to short-circuit either or both of said condenser units, as necessitated by the voltage to be measured. It is obvious that, by thus taking advantage of the existing properties of the several component elements, an instrument of exceptional simplicity, compactness and durability is obtained.

In the accompanying drawing, Figure 1 is a view, partially in vertical section and partially in elevation, of an instrument constructed in accordance with my invention. Fig. 2 is a diagrammatic view of the circuit connections of the instrument shown in Fig. 1, and Fig. 3 is a view, partially in vertical section and partially in elevation, of a portion of the condenser bushing shown in Fig. 1.

Referring to the drawing in detail, an electrical measuring instrument 1 comprises a metallic receptacle or tank 2 containing a suitable insulating liquid 3 and connected to ground at G, a cover plate 4 for said receptacle, a movable vane 5, a plurality of stationary vanes 6 and 7 disposed in electrostatic relation to the vane 5, an indicating mechanism 8, a condenser bushing 9, a plurality of condenser units 10 and 11, and suitable means 12 and 13 for short-circuiting the condenser units. The movable vane 5 comprises a pair of hollow cylindrical bodies 14 and 15, and a connecting member 16. The movable vane 5 is pivotally suspended from the cover plate 4 by means of the indicating mechanism 8, a yoke member 17 and an insulating rod 18.

The indicating mechanism 8 comprises a bracket member 19, which is suitably secured to the cover plate 4 and is adapted to support a spindle 20 between upper and lower bearings 21 and 22, respectively. A pointer or indicator 23 projects laterally from the spindle 20 and coöperates with a plurality of differently calibrated scales 24, 25 and 26 upon the upper side of the cover plate 4, to indicate, by its angular deflections, the forces measured by the instrument. The spindle 20 is surrounded by a spiral spring 27, the opposite ends of which are connected, respectively, to said spindle and to the bracket member 19, rotation of the movable vane 5 from its normal position being opposed by the tension thereof.

The stationary vanes 6 and 7 are cylindrically curved and are so arranged that their concave surfaces oppose each other and are in close proximity to the cylindrical bodies 14 and 15. The stationary vane 6 is suspended from the cover plate 4 by means of insulating rods 28 and 29, while stationary vane 7 is mounted upon the terminal bushing 9 and in electrical contact with one of its conducting layers by means of a supporting member 30. One end of said supporting member 30 is attached to said stationary vane and its other end is provided with two arms 32, which are adapted to surround said bushing and to be securely clamped thereto by means of a screw 33. The member 30 is also provided with an opening 31 for a purpose to be hereinafter explained. The vanes 6 and 7 are so disposed with respect to the movable vane 5 that, as the latter is deflected from its normal or zero position, the distances between the bodies 14 and 15 and the vanes 6 and 7 decrease at such a rate that the scales 24, 25 and 26 may be uniformly sub-divided.

The condenser bushing 9, which is surrounded by a metallic sleeve 34, extends through a suitable opening 35 in the cover plate 4 and is secured in position by means of bolts 36. The bushing 9 is of the well-known "condenser type" of construction and comprises a metallic tube 37, about which are wound alternate layers of insulating material 38 and conducting material 39. The innermost layers are relatively long and the outer layers are relatively short, so that a stepped structure is provided, in which the extremities of adjacent conducting layers are separated by considerable lengths of insulation.

The upper end 40 of the tube 37 constitutes the external terminal of the instrument from which a coil spring 41 is suspended within the tube by means of a conducting wire 42. A metallic sphere 43 is similarly suspended by a conducting wire 44 from lower end 45 of said spring. An insulating cord 46 is suitably secured to the sphere 43 and extends through the opening 31 in the supporting member 30 and through an opening 47 in the cover plate 4. The extremity of said cord is provided with a knob or button 48 which normally rests upon the top of the cover 4 and may be utilized to pull the sphere 43 into contact with the supporting member 30 against the action of spring 45. The condenser unit 11 comprises a plurality of sections 49 which constitute parts of condenser bushing 9, and condenser unit 10 embodies the stationary vane 6, the adjacent grounded casing 50 and the interposed insulating liquid.

In order to bridge across condenser unit 10 a sphere 51 is attached to the grounded casing 50 by means of a flexible conducting connection 52, and is also provided with an insulating cord 53 which extends up through insulating rod 28 and is attached to a button 54 which normally rests upon the cover 4. Barriers 55 and 56 are interposed between the condenser bushing 9 and the adjacent side and bottom walls, respectively, of the receptacle 2, in order to prevent a discharge from said bushing to ground through the intervening insulating liquid.

It is well known in the art that a condenser bushing of the type described consists of a plurality of concentric condensers and that the total potential is distributed between its component layers. It is therefore evident that, if stationary vane 7 is connected to a conducting layer 57, the voltage impressed upon said vane is equal to the total potential of the circuit minus the drop in potential over the layers 49 which intervene between the supporting member 30 and the tube 37.

Referring more particularly to Fig. 2, it will be noted that the stationary vanes 6 and 7 are connected in parallel to a plurality of layers which exist between the layer 57 and the grounded sleeve 34. Therefore, the drop of potential over said sections is, in reality, what is measured by the instrument, and it is evident that, by properly designing and arranging the stationary and movable vanes, said vanes may be adapted to be connected in parallel to any desired number of layers which compose the condenser bushing. However, those skilled in the art will readily understand that the operation of the instrument is not affected if the ground connection 58 is removed so long as the sleeve 34 is at the same potential as the receptacle 50 and, in such case, condensers 10 and 11 and the stationary and movable vanes may be regarded as connected in series between the source of line potential and the ground. If, as shown on the drawings, the condensers 10 and 11 are actually in circuit, the instrument is adapted to the measurement of the highest voltages of which it is capable, and the voltage which exists between stationary vanes 6 and 7 will be equal to the potential of the circuit minus the sum of the drops in potential across the condensers 10 and 11. The voltage corresponding to the actuating force will, therefore, be indicated upon the scale 24. If it is desired to adapt said measuring instrument for a range of voltages lower than can be accurately indicated upon scale 24, the plurality of layers which constitute condenser 11 may be short-circuited, by pulling the sphere 43 upwardly into contact with the supporting member 30, by means of the cord 46 and the button 48. Under these conditions, the voltage which exists between stationary vanes 6 and 7 is equal to the difference between the terminal voltage and the potential drop across condenser 10, the direct voltage reading being indicated upon scale 25. If a still lower range of readings is desired, condenser 10 may be short-circuited by sphere 51 which is drawn into engagement with stationary vane 6 by means of the cord 53 and the button 54. It is evident that, under these conditions, the full voltage of the line is impressed upon the stationary vanes 6 and 7, and an indication of the said existing voltage may be obtained upon the scale 26.

While I have shown and described particular means for accomplishing specific purposes, it is evident that modifications in structural details and in the arrangement and location of parts may be effected without departing from the spirit and scope of my invention, and I desire that only such limitations shall be imposed as are indicated in the appended claims.

I claim as my invention:

1. An electrical measuring instrument comprising a receptacle containing insulating liquid, a condenser bushing composed of alternate layers of insulating and conducting materials, and adapted to extend through an opening in said receptacle and to separate the source of potential from said receptacle, a movable member and stationary vanes arranged in electrostatic relation and connected in parallel to one or more layers of said bushing.

2. An instrument adapted for a plurality of ranges of measurement and comprising a receptacle containing insulating liquid, two stationary vanes and a movable member supported in electrostatic relation thereto, a condenser bushing composed of alternate layers of insulating and conducting materials, one of said stationary vanes being electrically connected to an intermediate conducting layer of said bushing and the second stationary vane, the receptacle and the intermediate liquid constituting a condenser unit, means for short-circuiting said condenser unit, and a separate means for short-circuiting the plurality of layers between said intermediate layer and the source of potential.

3. An electrical measuring instrument comprising a receptacle, a condenser bushing composed of alternate layers of insulating and conducting materials, stationary vanes and a movable member supported in electrostatic relation thereto, and a condenser unit, said condenser unit and said stationary and movable vanes being connected in series with each other and in multiple to one or more layers of said condenser bushing.

4. An instrument comprising a receptacle containing insulating liquid, a condenser bushing composed of alternate layers of insulating and conducting materials, stationary vanes and a movable member supported in electrostatic relation thereto, one of said vanes having a connection to a conducting layer of said bushing.

5. An electrical measuring instrument comprising a receptacle containing insulating liquid, stationary and movable vane members disposed in electrostatic relation, and a condenser bushing composed of alternate layers of insulating and conducting materials for insulating the high potential conductor from said receptacle, one stationary vane member being mounted upon the condenser bushing and in electrical contact with a conducting layer thereof.

6. An electrical measuring instrument comprising a receptacle containing insulating liquid, stationary and movable vane members arranged in electrostatic relation, and a condenser bushing composed of alternate layers of insulating and conducting materials for introducing the high potential to be measured through the receptacle, said stationary and movable vanes being connected in series with a plurality of layers of said bushing, between the source of potential and the receptacle.

7. The combination with an instrument comprising a receptacle containing insulating liquid, stationary vanes and a movable member supported in electrostatic relation, of a condenser bushing composed of alternate layers of insulating and conducting materials, one of said stationary vanes being secured to said bushing and in electrical contact with one of its conducting layers, a coiled spring suspended within said bushing, a conducting body suspended from said spring at the lower extremity of said bushing, and means for causing said body to make contact with the stationary vane which is associated with said bushing.

8. An electrical measuring instrument comprising a receptacle, containing a body of insulating liquid, a bushing composed of alternate layers of insulating and conducting materials, a movable member and two stationary vanes disposed in electrostatic relation, one of said stationary vanes being suitably suspended and insulated from the cover and in proximity to a side wall of said receptacle and the other being held in position by a supporting member which is clamped to said condenser bushing and in electrical contact with one of its conducting layers.

9. An electrical measuring instrument adapted for a plurality of ranges of measurement, and comprising a receptacle containing a body of insulating liquid, a condenser bushing composed of alternate layers of insulating and conducting materials, stationary vanes and a movable member supported in electrostatic relation, one or both of said stationary vanes coöperating with the liquid and adjacent metal parts to form condensers, and separate means comprising yieldingly suspended conducting bodies and members of insulating material attached thereto for short-circuiting said condensers.

10. The combination with a bushing composed of alternate and concentric layers of insulating and conducting material forming a condenser unit, of an electrostatic indicating device associated with said bushing having a portion thereof supported thereby and electrically connected to one of its conducting layers.

11. The combination with a bushing comprising alternate and concentric layers of conducting and insulating material constituting a condenser unit, of an indicating instrument electrically connected to one of said conducting layers and means for supporting a portion of the said indicating instrument from one of said conducting layers.

12. The combination with a bushing, comprising alternate and concentric layers of insulating and conducting material, of an indicating device connected in parallel to one of more layers of said bushing, and means for supporting a portion of the said indicating device from one layer of the said bushing.

13. The combination with a plurality of condensers connected in series relation, one of which constitutes a bushing comprising alternate and concentric layers of insulating and conducting material, of an electrostatic indicating instrument connected in parallel to a portion of the layers of said bushing.

In testimony whereof, I have hereunto subscribed my name this 18th day of August, 1910.

ARTHUR B. REYNDERS.

Witnesses:
  C. W. McGHEE,
  R. J. DEARBORN.